United States Patent Office 3,833,676
Patented Sept. 3, 1974

3,833,676
FLUORINATION OF 1,1,1-TRICHLOROETHANE WITH HYDROGEN FLUORIDE
Rokuo Ukaji, Ibaragi, and Ichiro Morioka, Matsubara, Japan, assignors to Daikin Kogyo Co., Ltd.
Filed July 28, 1971, Ser. No. 166,729
Claims priority, application Japan, July 28, 1970, 45/66,339
Int. Cl. C07c 17/20, 19/08
U.S. Cl. 260—653.7    9 Claims

ABSTRACT OF THE DISCLOSURE

In the fluorination of 1,1,1-trichloroethane with hydrogen fluoride, a process wherein one molar amount of 1,1,1-trichloroethane is treated with a not less than 4 molar amount of hydrogen fluoride in a liquid phase in the absence of any catalyst at a temperature from 70 to 140° C. to give 1,1,1-dichlorofluoroethane and 1,1,1-chlorodifluoroethane selectively. The advantages of such process are (1) the use of no catalyst, wherein the various problems encountered in the use of a catalyst are overcome, (2) the elimination of the formation of tar substances as by-products and (3) the smooth proceeding of the reaction without agitation.

---

Figure 1:
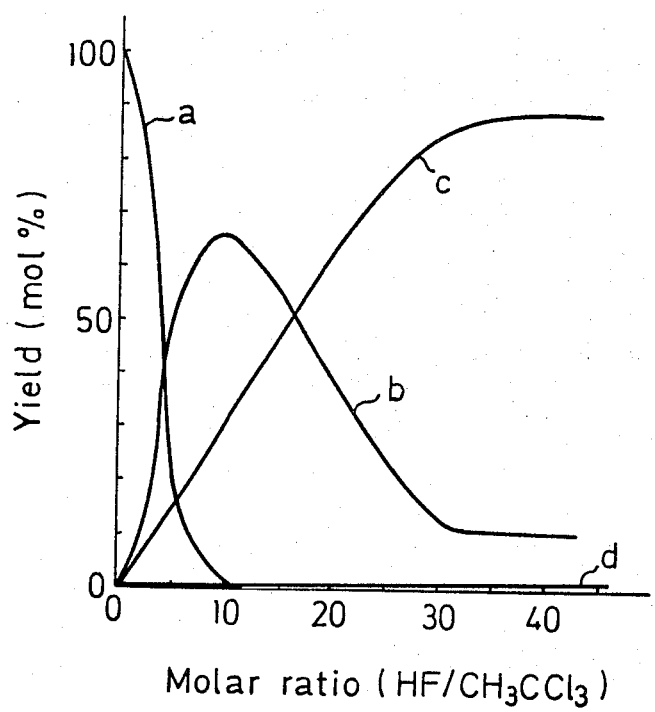

The present invention relates to a process for the fluorination of 1,1,1-trichloroethane. More particularly, it relates to a process for the fluorination of 1,1,1-trichloroethane with hydrogen fluoride to produce 1,1,1-dichlorofluoroethane and 1,1,1-chlorodifluoroethane, selectively.

Fluorinated halocarbons have heretofore been prepared by the fluorination of halocarbons. Thus, the fluorination of halocarbons with hydrogen fluoride in the presence of certain catalysts affords fluorohalocarbons [cf. U.S. Pats. Nos. 2,744,147, 2,744,148, 2,894,044, etc.]. In such fluorination, however, the production of tar substances is unavoidable so that the life of the catalyst is limited and the occasional change of the catalyst is required. Operations requiring change and reactivation of the catalyst are troublesome.

Although the fluorination of 1,1,1-trichloroethane with hydrogen fluoride in the absence of any catalyst is described in U.S. Pat. 2,146,354, the reaction conditions and the compositions of the products depending thereon are not clear. In addition, it is suggested to effect the reaction at a relatively high temperature of around 150° C. However, the use of such high temperatures results in the production of tar substances as a by-product.

It has now been found that the fluorination of 1,1,1-trichloroethane with hydrogen fluoride in the absence of any catalyst, and the use of hydrogen fluoride in an amount of 4 mol or more per 1 mol of 1,1,1-trichloroethane selectively produces 1,1,1-dichlorofluoroethane and 1,1,1-chlorodifluoroethane with a nearly 100% conversion of the starting material, i.e., 1,1,1-trichloroethane. It has also been found that the suitable control of the molar ratio of 1,1,1-trichloroethane and hydrogen fluoride gives 1,1,1-dichlorofluoroethane and 1,1,1-chlorodifluoroethane in an optional ratio.

The above findings are of an unexpected and surprising nature, because the use of hydrogen fluoride in such an excessive amount is rather expected to produce more fluorinated substances (e.g. 1,1,1-trifluoroethane).

According to the present invention, the fluorination is effected by treating one molar amount of 1,1,1-trichloroethane with a not less than 4 molar amount of hydrogen fluoride in a liquid phase in the absence of any catalyst to give selectively 1,1,1-dichlorofluoroethane and 1,1,1-chlorodifluoroethane.

The use of hydrogen fluoride in a 4 to 30 molar amount to one molar amount of 1,1,1-trichloroethane is particularly preferred. When the molar ratio of hydrogen fluoride to 1,1,1-trichloroethane is 15 to 30, the yield of 1,1,1-chlorodifluoroethane will be especially increased.

The reaction temperature is usually from 70 to 140° C., preferably from 90 to 130° C. A lower temperature than 70° C. results in the marked decrease of the reaction rate, whereas a higher temperature than 140° C. causes the increased production of tar substances. The reaction pressure is associated with the reaction temperature and may require normally a pressure not lower than 10 kg./cm.², advantageously a pressure above 20 kg./cm.², for maintaining the reaction system in a liquid state.

During the reaction, agitation may be effected. But, it is notable that, even when agitation is not carried out, the fluorination can be accomplished smoothly. This is quite advantageous from an industrial viewpoint, because the reactor is not required to be equipped with an agitator and the reaction operation is made simple. In fact, hoydrogen fluoride is corrosive so that, if an agitator is utilized, the material therefor must be carefully selected in order to avoid corrosion, which, of course, increases the expense for the equipment.

By taking the fluorination at 110° C. and 90° C. as examples, the relationship between the molar ratio of hydrogen fluoride to 1,1,1-trichloroethane and the yields of the products are illustrated below.

Figure 2:
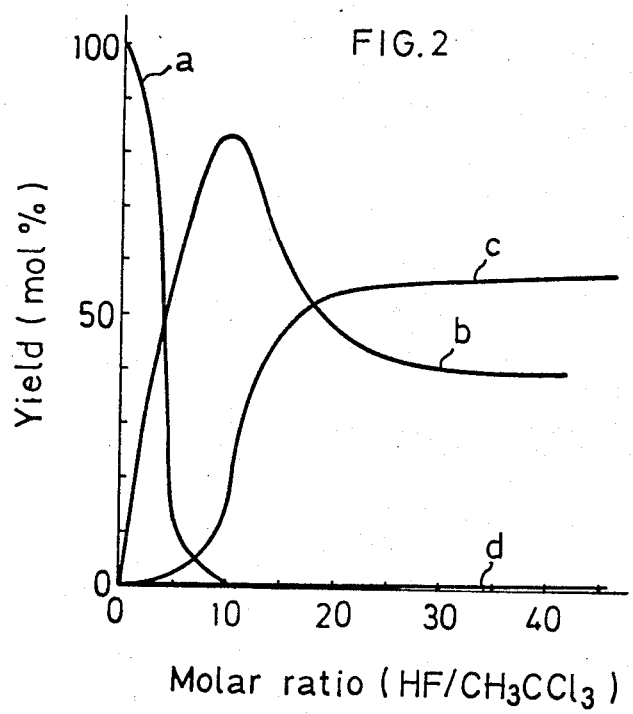

In a polytrifluorochloroethylene made reactor of 38 mm. in inner diameter and 200 mm. in height, hydrogen fluoride (20 g.) was charged, and 1,1,1-trichloroethane was added thereto. The reaction was carried out at 110° C. or 90° C. for 1 hour without agitation. The yields of the products in the reactor with the variation of the molar ratio of hydrogen fluoride to 1,1,1-trichloroethane are shown in the accompanying drawings wherein FIGS. 1 and 2 are respectively the results of the reaction at 110° C. and 90° C. and the graphs (a), (b), (c) and (d) are, respectively, 1,1,1-trichloroethane, 1,1,1-dichlorofluoroethane, 1,1,1-chlorodifluoroethane and 1,1,1-trifluoroethane.

From the above results, it can be seen that 1,1,1-dichlorofluoroethane and 1,1,1-chlorodifluoroethane are selectively produced in the fluorination of 1,1,1-trichloroethane at 110° C. and 90° C. It can be also seen that the yields of 1,1,1-dichlorofluoroethane and 1,1,1-chlorodifluoroethane increase abruptly when the molar ratio of hydrogen fluoride to 1,1,1-trichloroethane is 4 or more in spite of the reasonable assumption that the sufficient molar ratio of hydrogen fluoride to 1,1,1-trichloroethane for production of 1,1,1-dichlorofluoroethane and 1,1,1-chlorodifluoroethane may be from 1 to 2.

Compared with conventional fluorination methods using catalysts, the process of this invention using no catalyst is advantageous in that no material by-production of tar substances is produced. For instance, the performance of the fluorination in the presence of fluorosulfuric acid at 100° C. produces a large amount of tar substances, whereas the execution in the absence of any catalyst, according to this invention, gives tar substances only in trace amounts even at 130° C. Thus, the objective fluorinated products can be obtained in higher yields without the loss of the starting unfluorinated compound. Moreover, the fluorination can be performed by a simple operation without the problems of changing and reactivating the catalyst.

1,1,1-dichlorofluoroethane and 1,1,1-chlorodifluoroethane produced by this invention can be readily separated into each substance by a per se conventional separation procedure such as distillation. The former is useful as a starting material for the production of vinyl fluoride, and the latter is useful as a starting material for the production of vinylidene fluoride, a propellant or a blowing agent.

Practical and presently preferred embodiments of the present invention are illustratively shown in the following Examples.

EXAMPLE 1

In a stainless steel reactor of 50 mm. in inner diameter and 150 mm. in height, there are charged hydrogen fluoride (2.4 g.) and 1,1,1-trichloroethane (3.7 g.) (the molar ratio of $HF:CH_3CCl_3=4.3:1$). The contents are stirred in a bath maintained at 110° C. by the aid of a magnetic stirrer and a rotating element coated with polytetrafluoroethylene resin. After a definite period of time, the reaction mixture is cooled in a trichloroethylene-Dry Ice bath, and water is added thereto, whereby hydrogen fluoride is converted into hydrofluoric acid. The resultant mixture is subjected to gas chromatographic analysis, the results of which are shown in Table 1 with variation of the reaction time.

TABLE 1

| | Composition of product (molar percent) | | | |
|---|---|---|---|---|
| | $CH_3CCl_3$ | $CH_3CCl_2F$ | $CH_3CClF_2$ | $CH_3CF_3$ |
| Reaction time (min.): | | | | |
| 30 | 28 | 49 | 23 | Trace. |
| 60 | 18 | 45 | 49 | Do. |
| 90 | 14 | 34 | 63 | Do. |
| 120 | 10 | 24 | 70 | Do. |

EXAMPLE 2

In the same manner as in Example 1 except that the amounts of hydrogen fluoride and 1,1,1-trichloroethane are changed respectively to 17 g. and 3.73 g. (the molar ratio of $HF:CH_3CCl_3=30.3:1$) and the stirring is not performed, the reaction of 1,1,1-trichloroethane with hydrogen fluoride is carried out. The results are shown in Table 2.

TABLE 2

| | Composition of product (molar percent) | | | |
|---|---|---|---|---|
| | $CH_3CCl_3$ | $CH_3CCl_2F$ | $CH_3CClF_2$ | $CH_3CF_3$ |
| Reaction time (min.): | | | | |
| 15 | 0.1 | 58.2 | 41.7 | 0.03 |
| 30 | 0.11 | 34.0 | 65.7 | 0.2 |
| 60 | 0.05 | 12.9 | 86.2 | 0.8 |
| 90 | 0.08 | 4.3 | 94.5 | 1.1 |
| 120 | Trace | 2.3 | 95.5 | 2.1 |

It is claimed:

1. In the fluorination of 1,1,1-trichloroethane with hydrogen fluoride in the absence of any catalyst, a process wherein one molar amount of 1,1,1-trichloroethane is treated with at least a 4 molar amount of hydrogen fluoride in the liquid phase at a temperature of from 70° to 140° C. to give 1,1,1-dichlorofluoroethane and/or 1,1,1-chlorodifluoroethane.

2. A process for producing fluorinated halocarbons which comprises treating one molar amount of 1,1,1-trichloroethane with at least a 4 molar amount of hydrogen fluoride in the absence of any catalyst in the liquid phase at a temperature of from 70° to 140° C. to give 1,1,1-dichlorofluoroethane and/or 1,1,1-chlorodifluoroethane.

3. The process according to claim 2, wherein the hydrogen fluoride is used in an amount of 4 to 30 mol per 1 mol of 1,1,1-trichloroethane.

4. The process according to claim 2, wherein the hydrogen fluoride is used in an amount of 15 to 30 mol per 1 mol of 1,1,1-trichloroethane.

5. The process according to claim 1, wherein the reaction is effected at a temperature from 90 to 130° C.

6. The process according to claim 2, wherein the reaction is effected at a temperature from 90 to 130° C.

7. The process according to claim 2, wherein the reaction is effected under a pressure of more than 10 kg./cm.$^2$.

8. The process of claim 4, wherein chlorodifluoroethane is produced, selectively.

9. The process according to claim 2, wherein the reaction is effected under a pressure of at least 20 kg./cm.$^2$.

References Cited

UNITED STATES PATENTS

| 2,146,354 | 2/1939 | Scherer | 260—653.7 |
| 2,894,044 | 7/1959 | Prill | 260—653.7 |

FOREIGN PATENTS

| 126,948 | 3/1948 | Australia | 260—653.7 |

DANIEL D. HORWITZ, Primary Examiner